United States Patent [19]
Falduti et al.

[11] Patent Number: 5,481,928
[45] Date of Patent: Jan. 9, 1996

[54] MODULAR WALL MEMBER OF AN ENCLOSURE FOR COVERING A RECEPTACLE AND IN PARTICULAR THE VESSEL HEAD OF A NUCLEAR RECTOR

[75] Inventors: Claude Falduti, Saint-Michel-sur-Orge; Norbert Bouron, Acheres, both of France

[73] Assignee: Framatome, Courbevoie, France

[21] Appl. No.: 192,581

[22] Filed: Feb. 7, 1994

[30] Foreign Application Priority Data

Feb. 17, 1993 [FR] France ................... 93 01799

[51] Int. Cl.⁶ .................................................. G01N 1/02
[52] U.S. Cl. ..................... 73/863.81; 73/863.33
[58] Field of Search .............. 73/863.33, 863.81, 73/863.83, 863.86, 40.5 R, 49.2, 49.1, 49.3; 376/250

[56] References Cited

U.S. PATENT DOCUMENTS

| | | | |
|---|---|---|---|
| 4,178,729 | 12/1979 | Jennings | 376/250 |
| 4,380,168 | 4/1983 | Ibe | 376/250 |
| 4,406,855 | 9/1983 | Schwiers et al. | 376/250 |
| 5,048,324 | 9/1991 | Thompson | 73/49.2 |
| 5,269,173 | 12/1993 | Henneck et al. | 73/49.2 |

FOREIGN PATENT DOCUMENTS

| | | |
|---|---|---|
| 049438 | 9/1981 | European Pat. Off. . |
| 1463029 | 9/1965 | France . |
| 1569898 | 6/1969 | France . |
| 2117230 | 6/1972 | France . |
| 828908 | 9/1975 | France . |
| 2444994 | 12/1979 | France . |
| 3616733 | 11/1987 | Germany . |
| 0068634 | 3/1989 | Japan ................. 73/40.5 R |

Primary Examiner—R. Raevis
Attorney, Agent, or Firm—Pollock, Vande Sande & Priddy

[57] ABSTRACT

The wall member (35a, 35c, 35d) of the enclosure comprises ducts (46a, 46c, 49d) for sampling fluid from or for injecting fluid into a chamber (44) delimited by the enclosure and the outer surface of a receptacle (32) enclosing a fluid at high temperature. The ducts (46a, 46c, 46b) comprise apertures (47a, 47c, 49d) on the inner surface of the wall member and at least one sampling or injection pipe (48, 50) opening onto the outer surface of the wall member. The wall member may be a heat-insulating modular panel for covering the head (32) of the vessel of a pressurized water nuclear reactor.

8 Claims, 6 Drawing Sheets

MODULAR WALL MEMBER OF AN ENCLOSURE FOR COVERING A RECEPTACLE AND IN PARTICULAR THE VESSEL HEAD OF A NUCLEAR RECTOR

FIELD OF THE INVENTION

The invention relates to a modular heat-insulating wall member of a confinement enclosure comprising a means for sampling or for injection of fluid, and in particular a wall member of an enclosure for confinement and for covering the convex upper surface of the head of the vessel of a pressurized water nuclear reactor.

BACKGROUND OF THE INVENTION

Pressurized water nuclear reactors generally comprise a vessel enclosing the reactor core which is immersed in the pressurized water for cooling the reactor.

The vessel of generally the reactor, of cylindrical shape, comprises a head in the form of a spherical cap which can be added onto its upper part so that the head presents a convex outer upper surface. The head is pierced by apertures at the level each of which is secured by welding in vertical position, a tubular penetration piece constituting an adaptor ensuring the passage of an extension of a cluster for controlling the reactivity of the core or the passage of a measurement means, such as a thermocouple column, to the interior of the core.

Each of the tubular penetration pieces is engaged in an aperture passing through the head of the vessel and welded onto the concave lower surface of the head by an annular weld.

The adaptors intended to receive an extension of a cluster for controlling the reactivity of the core have an upper part projecting above the head of the vessel onto which is secured a control mechanism serving to move the extension securely attached to the cluster termed control rod.

Inspections carried out on nuclear reactors in service have shown that some of the penetration adaptors of the head of the vessel are liable to have cracks, after a certain time of utilization of the head, in particular in the weld zone of the adaptors, in the vicinity of the concave lower surface of the head. These cracks are liable to develop until they completely pass through the wall of the adaptor. In this case, limited but troublesome leakage of primary fluid constituted by the pressurized water may occur, to the outside of the head, through the crack and the space included between the adaptor and the penetration aperture of the head. The pressurized water constituting the leakage liquid, which is at very high temperature and which finds itself depressurized, evaporates, with the result that a release of steam occurs above the head. The steam contains some radioactive fission products which are liable to be found in the atmosphere above the vessel of the nuclear reactor. It is necessary to detect very rapidly the presence, in a penetration adaptor of the head of the vessel, of a crack right through it leading to leakage of primary fluid, in order to carry out a repair after shutting down the nuclear reactor and in order to prevent the release of gaseous radioactive substances into the confinement enclosure of the nuclear reactor.

The use of an envelope of heat-insulating material termed casing, which covers the convex upper surface of the head of the vessel in the penetration zone of the adaptors is known. This heat-insulating envelope serves to reduce the thermal flux emanating from the vessel of the reactor, in the direction of the control mechanisms secured to the ends of the adaptors.

The casing generally comprises a plane upper wall which comprises apertures permitting assembly of the casing around the adaptors comprising the control mechanisms, at the time of its installation. In contrast, the casing comes to rest, generally through the intermediary of a cylindrical lateral wall, on a support of the skirt for ventilation of the head of the vessel, the whole being assembled in non-leaktight manner.

As a result, the heat-insulating envelope does not ensure the confinement of the leakage gases which might be released above the head of the vessel; such leakage gases would on the contrary be carried away by the air for cooling the cluster control mechanisms, which circulates around the casing.

It is therefore not possible to carry out a detection of the possible presence of radioactive leakage gases above the head, inside the heat-insulating envelope.

In a copending application, applicants have proposed the use of a leaktight heat-insulating enclosure for confining and covering the head of the vessel of a pressurized water nuclear reactor.

The confinement enclosure which is constructed so as to be as leaktight as possible to the leakage gases which may emanate from the vessel is fixed onto the vessel head and around the adaptors, so as to prevent any substantial escape of gases. This leaktight enclosure delimits with the upper surface of the vessel a leaktight chamber in which the leakage gases emanating from the vessel of the reactor will be trapped. In order to detect the presence of radioactive gases revealing a leak at the level of an adaptor, there is associated with the confinement enclosure a device for sampling and possibly for injection of gases which is connected to a detection installation.

Preferably, such a leaktight enclosure is constructed in modular form by assembling wall members such as panels which comprise joining means fitted with leaktight seals.

In order to ensure effective detection of the presence of adaptors showing a leak, it is necessary to provide sampling means distributed in a satisfactory manner on the wall of the enclosure.

Means for constructing an enclosure which, during the construction of the enclosure provide a means for effective sampling of gases inside this enclosure, are unknown in the art.

This problem and the solution provided by the invention have a much more general scope than an application limited to the detection of leakage through the head of the vessel of a pressurized water nuclear reactor.

In fact, in the case of an enclosure or pipeline, enclosing a fluid at high temperature and possibly at high pressure, it may be advantageous to provide a heat-insulating enclosure surrounding all or part of the outer surface of the receptacle or of the pipeline, which can be constructed in modular form and which makes it possible to sample gases from or to inject gases into a chamber delimited by the wall of the enclosure and by the outer surface of the receptacle or of the pipeline.

SUMMARY OF THE INVENTION

The object of the invention is to propose a heat-insulating wall member of a confinement enclosure intended to cover at least part of the outer surface of a receptacle or of a pipeline enclosing a fluid at high temperature and to provide a chamber for confinement and for recovery of fluid with the outer surface of the receptacle, which makes it possible to carry out in a simple and effective manner a sampling and/or an injection of gases from and/or into the chamber for confinement and for recovery of fluid.

To this end, the modular wall member according to the invention comprises at least one means for sampling fluid from the chamber having at least one aperture opening onto an internal surface of the wall member directed in service towards the interior of the enclosure and at least one aperture opening onto an outer surface of the wall member opposite the inner surface.

Preferably, the modular wall member is a panel into which is incorporated at least one pipeline or a network for sampling or for injection of fluid.

BRIEF DESCRIPTION OF THE DRAWINGS

In order to give a clear understanding of the invention, the construction of a leaktight enclosure using modular wall members according to the invention will now be described, by way of example, with reference to the accompanying drawings.

DETAILED DESCRIPTION

Figure 1:
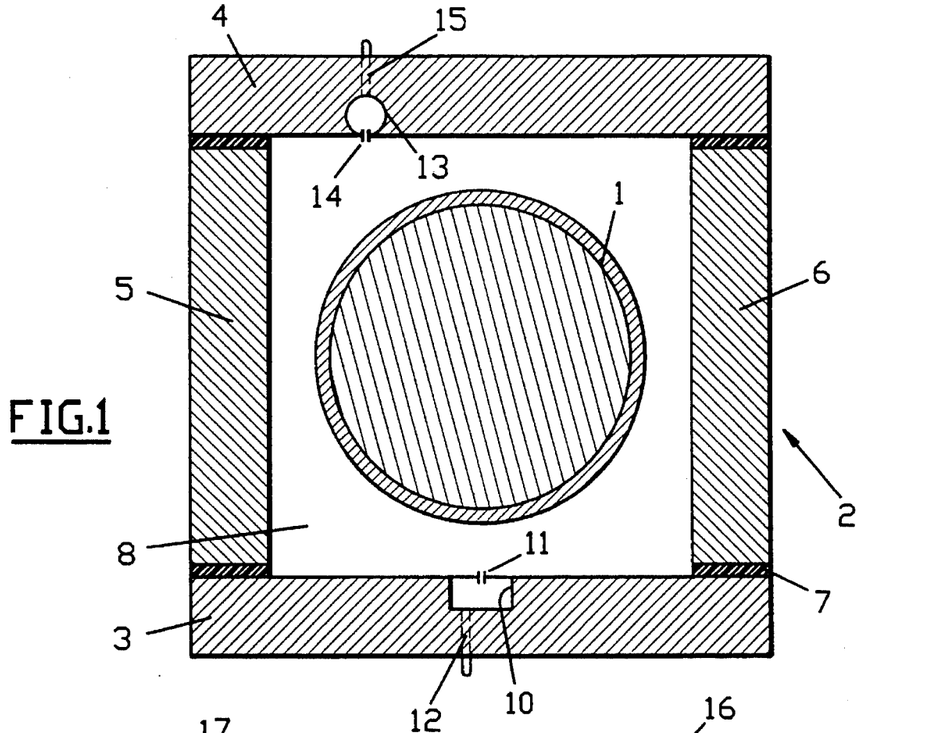
FIG. 1 is a view in section of a leaktight enclosure for confinement of a receptacle or of a pipeline, constructed from modular panels according to the invention.

FIG. 1 shows the circular cross-section of a device 1 which may be a receptacle or a pipeline enclosing a fluid at high temperature and possibly at high pressure.

The device 1 is disposed inside an enclosure 2 comprising a heat-insulating wall serving to insulate thermally the device 1 from the environment outside the enclosure.

The wall of the enclosure 2 is constructed in modular form, from heat-insulating panels such as 3, 4, 5 and 6 which are connected to one another along joint zones such as 7 in which are disposed leaktight seals.

The enclosure 2 delimits around the device 1 a chamber 8 between the inner wall of the panels 3, 4, 5, 6 and the outer surface of the device 1. The chamber 8 is insulated from the external environment in a leaktight manner, so that the enclosure 2 brings about the confinement of the outer surface of the device 1 and the retaining of fluid which may emanate from the internal volume of the device 1, in case of leakage through its wall.

The detection of fluid and in particular of gaseous compounds emanating from the interior of the device 1 into the chamber 8 serves to disclose the appearance of leaks through the wall of the device 1.

In order to detect the presence of a fluid emanating from the device 1 into the chamber 8, for example, in the form of a leakage gas, a sampling of gas is performed inside the chamber 8, this gas possibly being constituted for example by air in mixture with certain gaseous compounds emanating from the device 1.

According to the invention, the sampling can be performed from sampling means provided in some of the modular panels constituting the enclosure 2.

The panel 3 comprises a sampling duct 10 the cross-section of which can be seen in FIG. 1. This sampling duct is integrated into the panel 3 and disposed in the thickness of its wall, in the vicinity of its inner surface directed towards the interior of the enclosure 2, face-to-face with the outer surface of the device 1.

The inner wall of the duct 10 directed towards the interior of the enclosure 2 constitutes part of the inner surface of the panel 3.

In the case of a device 1 of some axial length, the duct 10 may be disposed in the panel 3 along its length. The inner wall of the duct 10 comprises apertures 11 opening into the chamber 8 inside the enclosure 2, spaced apart in a substantially regular manner in the longitudinal direction of the duct 10.

Moreover, a sampling pipe 12 connected to the duct 10 opens onto the outer surface of the panel, so as to connect the sampling duct 10 to an analysis and detection device situated outside the enclosure which can be connected to the connection pipe 12.

The panel 4 comprises a sampling duct 13 which is integrated into the wall of the panel, disposed along its length and placed in a position adjacent to the inner surface of the panel directed towards the interior of the enclosure and the outer surface of the device 1.

The duct 13 is of circular cross-section and comprises, along a generatrix directed towards the interior of the enclosure, sampling apertures 14 opening into the chamber 8.

A pipe 15 is connected to the sampling duct 13 and opens onto the outer surface of the panel 4.

The sampling duct 10 of rectangular cross-section and sampling duct 13 of circular cross-section can be used in order to carry out the sampling of gases inside the chamber 8, through the intermediary of the pipes 12 and 15. In this case, the sampling is carried out along the length of the device 1 which may be, for example, a receptacle or a pipeline of circular cross-section.

One of the ducts, for example the duct 13, could be used in order to effect the injection of a tracer gas inside the chamber 8, for example in order to carry out the calibration of the leak detection device or in order to flush out the chamber 8 with a cleaning and emptying gas.

The lateral panels 5 and 6 of the enclosure 2 may be constituted by simple heat-insulating panels fitted with leaktight means for connection to the panels 3 and 4.

The construction of an enclosure such as the enclosure 2 from modular members constituted by panels, around the device 1, necessitates only the fitting and assembling of panels which comprise, in an integrated manner, means for sampling gas from and for injecting gas into a leaktight chamber delimited by the enclosure around the device the heat-insulation of which is being effected.

Figure 2:
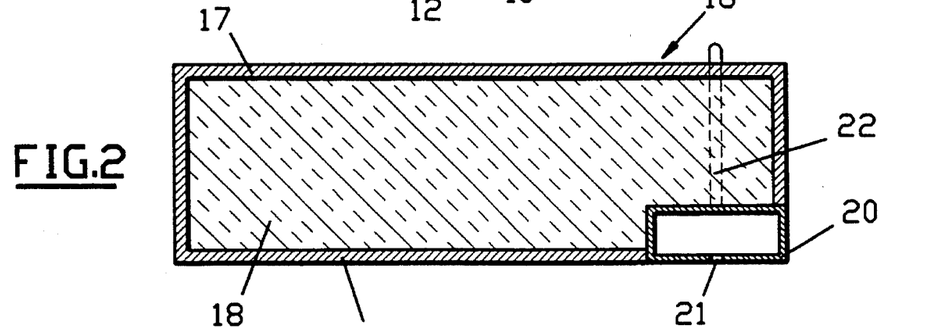
FIG. 2 is a view in section of a first embodiment of a modular heat-insulating panel according to the invention.
Figure 3:
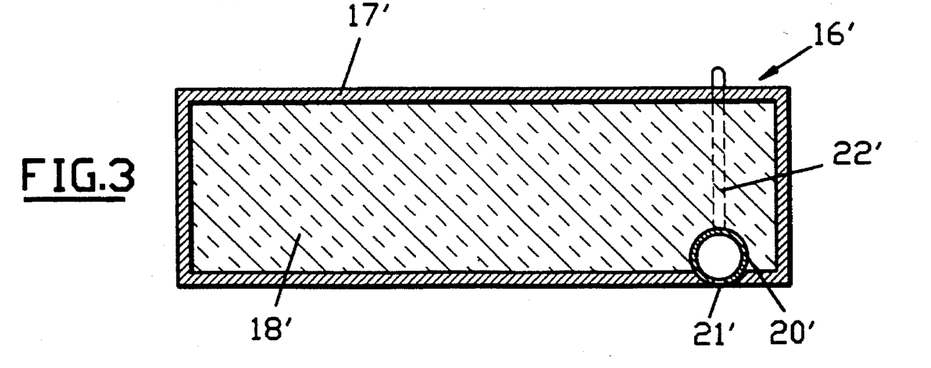
FIG. 3 is a view in section of a second embodiment of a modular heat-insulating panel according to the invention.

FIGS. 2 and 3 show heat-insulation panels which can constitute wall members according to the invention such as the wall members 3 and 4 of the enclosure 2 shown in FIG. 1.

The panel 16 shown in FIG. 2 comprises an outer envelope 17 which may, for example, constituted by a metal sheet. Inside the envelope 17 is disposed a heat-insulating filling material 18. A sampling duct 20 may be constituted by a metal sheet of parallelepipedal shape bent at a right angle welded into a corner of the envelope 17 or by an added tube of parallelepipedal cross-section. The wall 17, at the level of the duct 20, is pierced with apertures 21 and a pipe 22 is connected to the duct 20 so as to open onto the face of the panel 16 opposite the face on which are found the apertures 21.

In some applications, the envelope 17 may be constituted by a stainless metal sheet and the filling material 18 by corrugated leaves of stainless steel stacked on one another so as to constitute a material which is divided into leaves and alveolate.

In this case, the sampling duct 20 may be constituted by a metal plate bent at a right angle welded into a corner of the panel, so as to provide a space for circulation of gas and for sampling in the corner of the panel. Apertures 21 are then provided through the inner wall of the envelope 17 which is directed towards the interior of the enclosure constructed from modular panels, such as the panel 16.

The sampling pipe 22 opens onto the outer surface of the envelope 17 and constitutes a nozzle for connection of a circuit or of a device.

FIG. 3 shows a panel 16' constituted by a metal envelope 17' inside which is disposed a heat-insulating filling material 18'.

The sampling duct 20' is constituted by a tube of circular cross-section fixed, for example, by welding, onto the inner wall of the envelope 17' and comprising sampling apertures 21' which pass through the lower wall of the envelope 17' and the wall of the tube 20'.

A pipe 22' is connected to the tube 20' and opens onto the upper surface of the envelope 17' through a connection nozzle.

Figure 4:
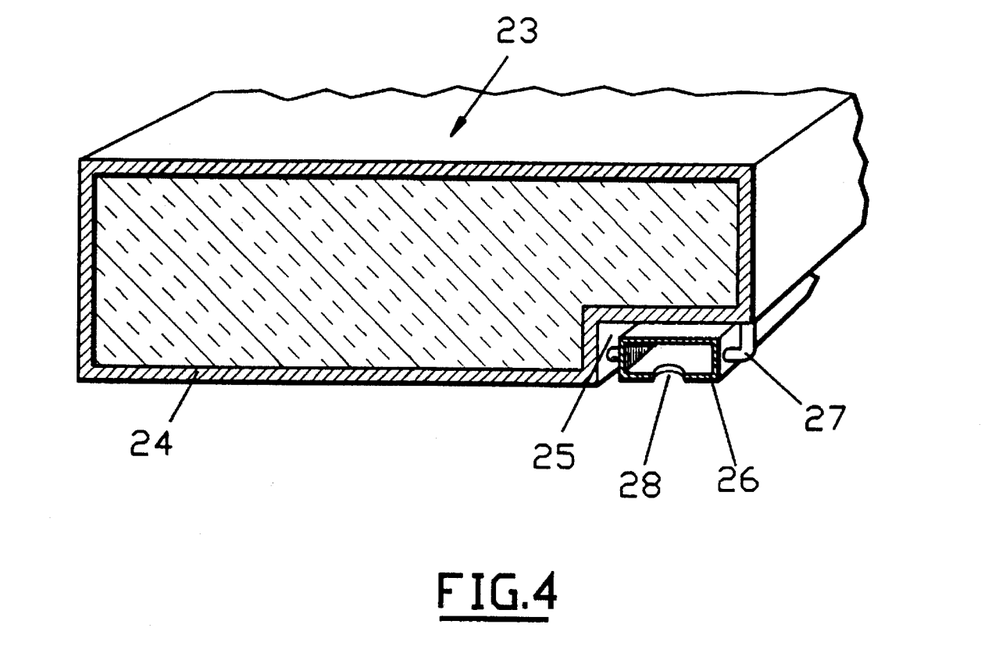
FIG. 4 is a view in section of a third embodiment of a heat-insulating modular panel according to the invention.
Figure 5:
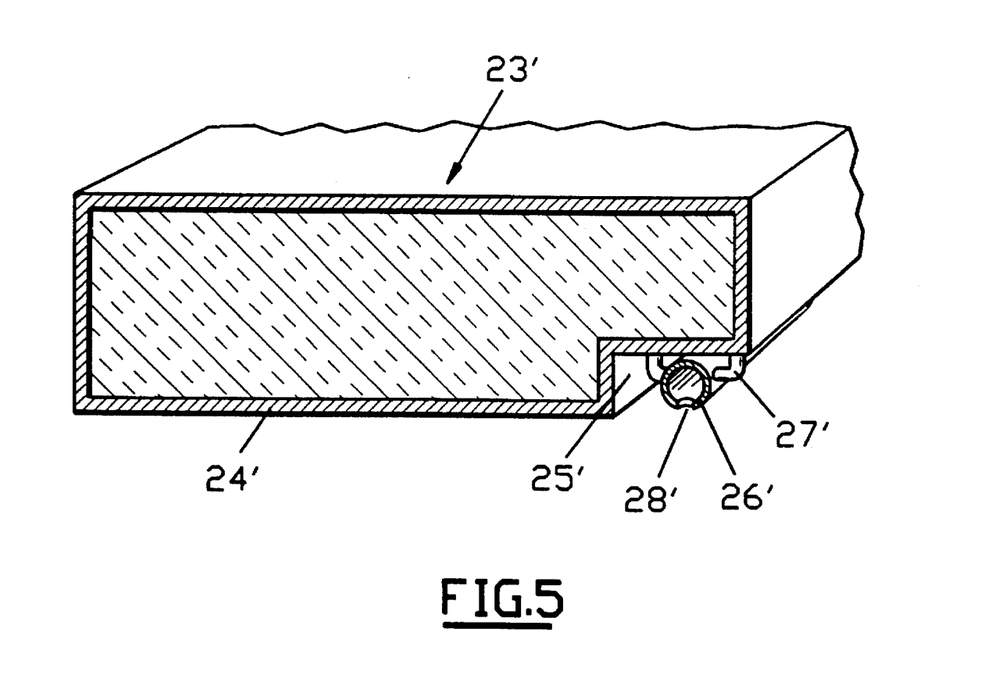
FIG. 5 is a view in section of a fourth embodiment of a modular heat-insulating panel according to the invention.

FIGS. 4 and 5 show heat-insulating panels 23 and 23' according to the invention. The panels 23 and 23' may comprise a structure substantially similar to the structure of the panels 16 and 16' shown in FIGS. 2 and 3, constituted by a metal envelope enclosing a heat-insulating material.

The metal envelope 24 or 24' of the panel 23 or 23' comprises on its inner surface intended to be directed towards the interior of the enclosure, a clearance 25 or 25' in which is housed and fixed the sampling duct 26 or 26', through the intermediary of fixing lugs or yokes 27 or 27'.

The sampling duct 26 of rectangular cross-section comprises apertures 28 opening on the side of the inner face of the panel 23.

Likewise, the sampling duct 26' of tubular shape with circular cross-section comprises apertures 28' opening on the side of the inner face of the panel 23'.

A sampling duct (not shown) is connected to the duct 26 (or 26') and opens at its other end onto the outer face of the panel 23 (or 23').

In all cases, it is advantageous to dispose the sampling duct on the side of the inner face of the panel, so as to facilitate the sampling and to avoid substantially impairing the thermal efficiency of the heat-insulation. The sampling ducts are therefore preferably disposed in the vicinity of the hotter face of the panel and face-to-face with the device to be thermally insulated.

In all cases, the lateral faces of panels which may be constituted, for example, by simple plane metal sheets, permit the panels to be joined against one another in leaktight manner by interposing a seal between them, for the constitution of an enclosure by modular members. As shown in FIG. 1, the lateral faces of the panels may equally well be joined in leaktight manner onto the inner face of other panels in order to constitute the enclosure.

The panels may comprise a single sampling pipeline or several pipelines forming a network and constituting on its own the sampling device of the enclosure or a modular member of this sampling device.

Figure 6:
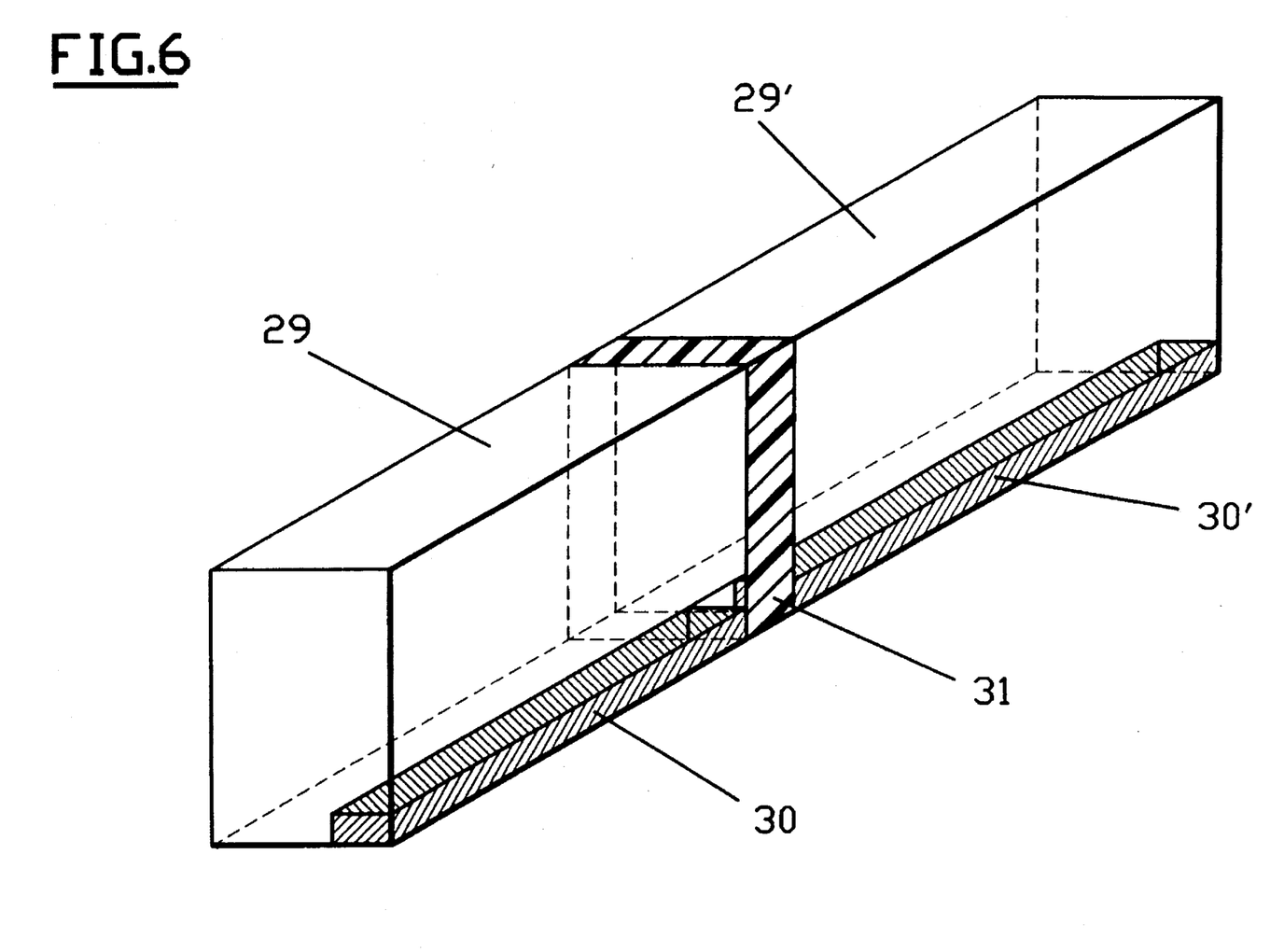
FIG. 6 is a perspective view of two modular heat-insulating panels according to the invention connecting to one another.

As shown in FIG. 6, adjacent panels such as 29 and 29' may be assembled so as to connect the sampling ducts provided on each of the panels.

The panel 29 and the panel 29' which may be constructed in a form as shown in FIG. 2 each comprise a longitudinal sampling pipe 30 and 30', respectively.

The panels 29 and 29' are assembled along two lateral faces, through the intermediary of a connection device 31 comprising seals and serving to connect in leaktight manner the lateral faces of the panels 29 and 29' and the end parts of the pipes 30 and 30'.

The pipes 30 and 30' connected in leaktight manner serve to constitute a single pipe extending over the entire length of the panels 29 and 29' connected to one another in order to constitute the enclosure.

The modular wall member according to the invention therefore serves to constitute part of a leaktight enclosure into which is integrated a device for sampling a fluid such as a gas inside the enclosure, all or part of the sampling device being arranged in the structure of the modular heat-insulating wall member of the enclosure.

Figure 7:
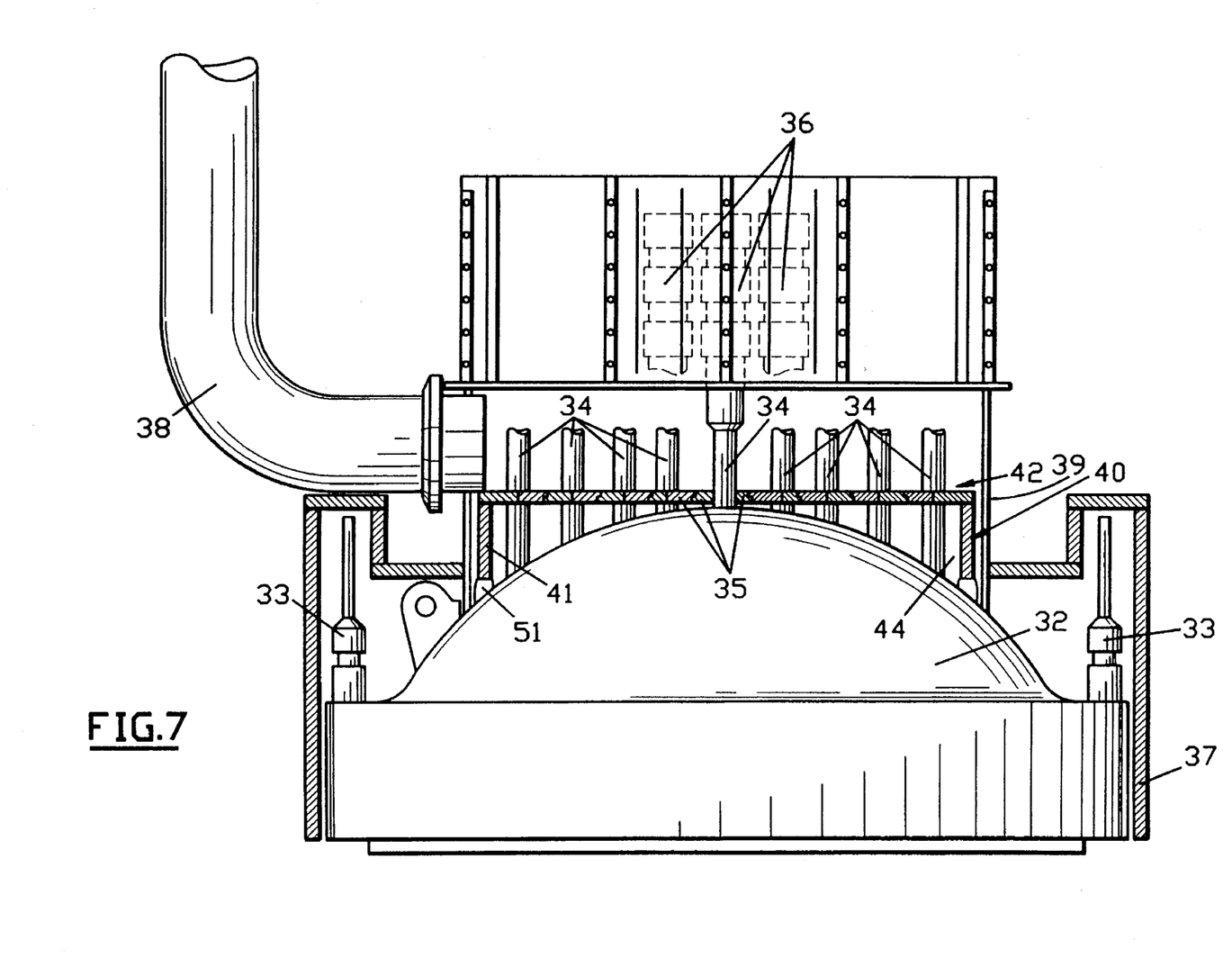
FIG. 7 is a view in elevation and in section through a vertical plane of a vessel head of a pressurized water nuclear reactor comprising a confinement enclosure constructed according to the invention.

FIG. 7 shows the head 32 of the vessel of a pressurized water nuclear reactor which is fixed by studs 33 onto the reactor vessel (not shown).

The head 32 comprises a domed outer surface in the form of an outwardly convex spherical cap. The head of the vessel has passing through it tubular adaptors 34 having vertical axes and which comprise a part projecting above the head of the vessel, inside a cylindrical skirt 39 resting on the upper part of the vessel head 32.

Each of the adaptors 34 comprises an upper part to which is fixed a mechanism 36 for moving an extension securely attached to a control cluster.

The mechanisms 36 serve to move control clusters in the core of the nuclear reactor, inside the vessel closed by head 32.

On the outside of the skirt 39 made of metal sheet surrounding the adaptors 34, is disposed an outer heat-insulating wall 37 limiting the transfers of heat from the head of the vessel 32, to the external atmosphere.

A suction duct 38 is connected to the skirt 39, so as to ensure a suction of air in order to cool the mechanisms 36.

Inside the skirt 39, on the convex upper surface of the head 32, is disposed a heat-insulating enclosure 40 constituted in modular form by wall members or panels according to the invention.

The heat-insulating enclosure 40 comprises a cylindrical lateral wall 41 and a plane upper wall 42, these walls being disposed underneath the suction duct 38.

As will be explained hereinbelow, the plane upper wall 42 and possibly the cylindrical lateral wall 41 are constituted by modular wall members according to the invention incorporating a device for sampling gas inside a chamber 44 delimited by the inner surface of the enclosure 40 and the convex outer surface of the head 32.

Figure 8:
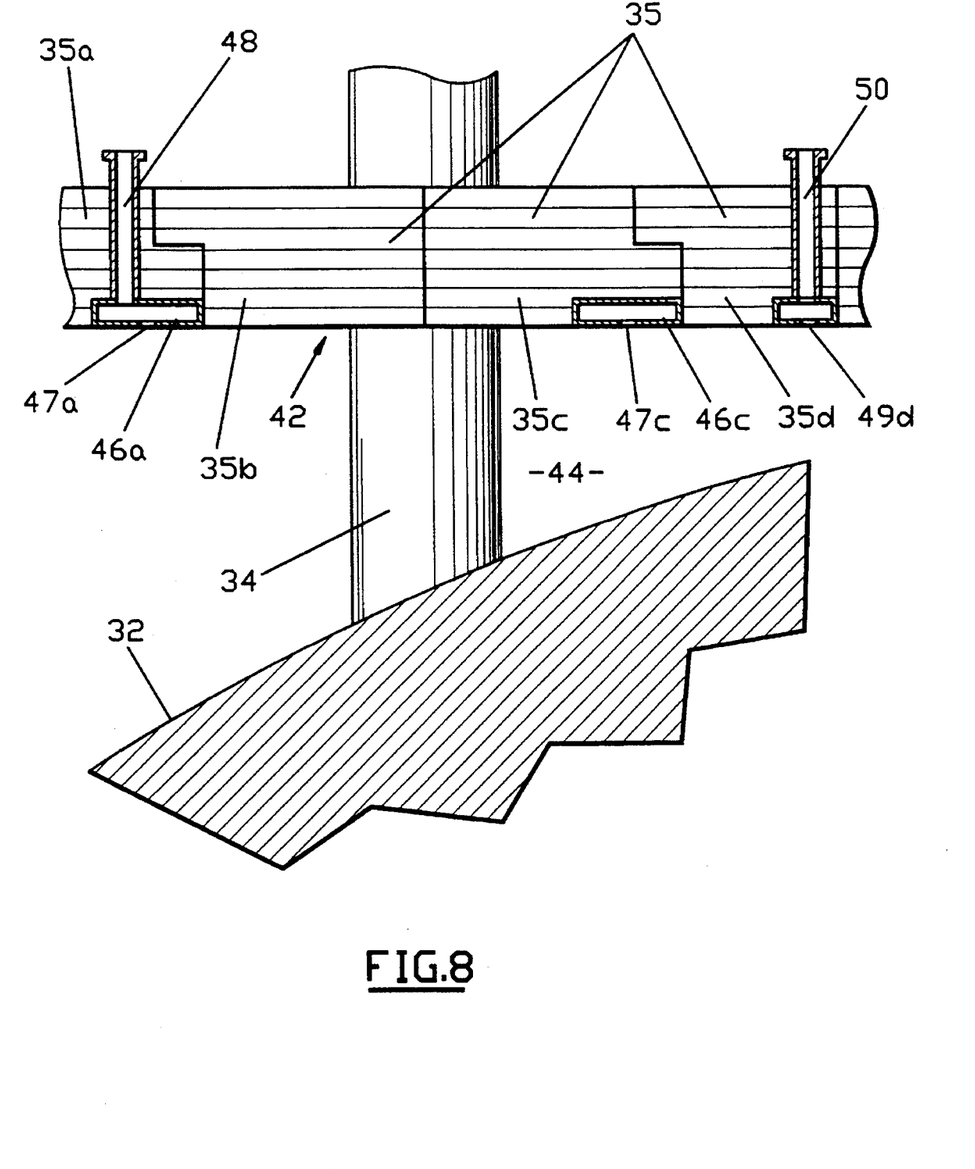
FIG. 8 is a view in section on a large scale of part of the wall of the enclosure for confinement of the vessel head shown in FIG. 7.
Figure 9:
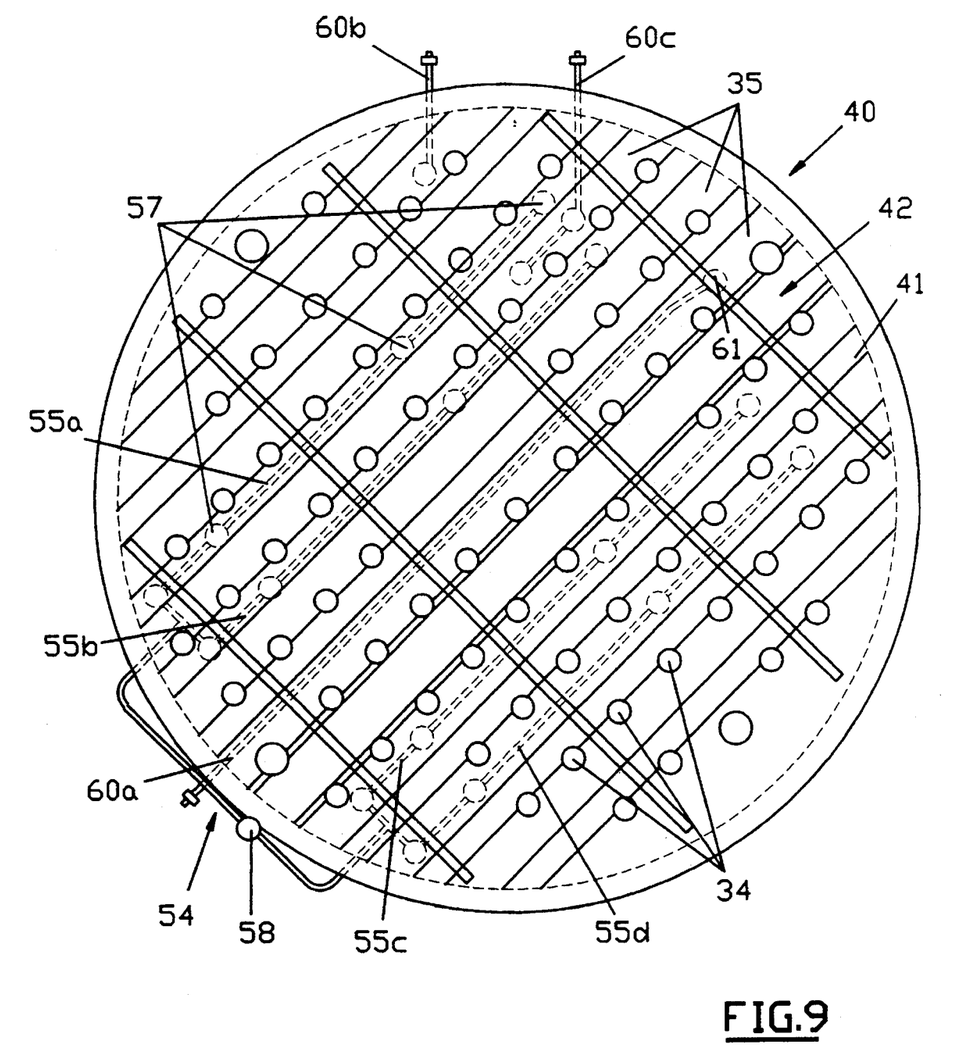
FIG. 9 is a plan view of the enclosure for confinement of the vessel head shown in FIG. 7.

As can be seen in FIGS. 8 and 9, the plane upper wall 42 of the heat-insulating enclosure 40 is constituted by heat-insulating panels 35 juxtaposed and connected in leaktight manner through the intermediary of lateral faces.

Some of the panels 35 constitute wall members according to the invention comprising means for sampling gas from or for injecting gas into the chamber 44 between the leaktight enclosure 40 and the vessel head 32.

FIG. 8 shows two panels 35a and 35c substantially similar to the panels 16 shown in FIG. 2. The panels 35a and 35c comprise a duct 46a and 46c respectively, for sampling gas in the chamber 44, comprising apertures 47a and 47c, respectively passing through the inner wall of the panels 35 directed towards the surface of the vessel head 32.

The sampling ducts 46a and 46c additionally communicate with the pipes such as 48 opening through a nozzle onto the outer surface of the corresponding panel.

Some panels such as 35d comprise injection ducts 49d communicating with a pipe 50 passing through the corresponding panel 35d as far as the outer face of the panel onto which the pipe 50 opens through a nozzle for connection to an injection device.

As can be seen in FIG. 9, the panels 35 are disposed parallel to one another and connected along their lateral faces, with interposition of seals, so that the upper wall 42 of the heat-insulating enclosure 40 has the maximum possible leaktightness to the gases contained by the chamber 44 above the vessel head.

Moreover, the upper wall 42 of the enclosure 40 is connected in leaktight manner to the cylindrical lateral wall 41, which comes to rest on the vessel head through the intermediary of a seal 51 (which can be seen in FIG. 7).

Some edges of panels 35 comprise apertures permitting the passage of the adaptors 34 the network, the disposition on the vessel head of which are shown in FIG. 9.

Seals are interposed between the apertures of the edges of the panels 35 and the adaptors 34, so that the enclosure 40 can confine and retain of the gases contained in the chamber 44.

In case of leakage at the level of the penetration through the vessel head by an adaptor 34, the fluid emanating from the vessel of the reactor is introduced in gaseous form into the chamber 44.

The panels 35, as explained above with reference to FIG. 8, comprise means for sampling these gases which can be collected by a detection device, so that the presence of leaks at the level of the adaptors 34 can be disclosed.

As can be seen in FIG. 9, a gas sampling network 54 is constituted by four parallel lines 55a, 55b, 55c and 55d which are interconnected and which are each integrated into a panel 35 in the same manner as the sampling ducts 46a and 46c are integrated into the panels 35a and 35c shown in FIG. 8.

On each of the sampling lines 55a, 55b, 55c and 55d are disposed sampling nozzles 57 placing the corresponding line in communication with the chamber 44 beneath the heat-insulating enclosure 40, in the same manner as the apertures 47a and 47c of the ducts 46a and 46c shown in FIG. 8.

A general sampling line 58, shown in FIG. 9, is connected to the sampling network 54 so as to ensure its connection to a detection device in order to analyze the gas sampled inside the chamber 44.

Injection lines are also associated with the panels 35 of the enclosure 40 in order to carry out the inspection and the calibration of the sampling and detection device.

A first injection line 60a is disposed in a substantially diametral direction of the upper wall 42 of the enclosure 40 and integrated into a panel 35 disposed along a diameter of the wall 42.

The injection line 60a comprises an injection nozzle.

Two secondary injection lines 60b and 60c are also integrated into panels 35, in a position offset laterally with respect to the panels placed in central and diametral positions.

The injection lines 60a, 60b and 60c comprise nozzles at their outer end serving to connect them to a device for injection of a gas permitting monitering and calibration of the sampling device, in the chamber 44.

The injection lines 60a, 60b and 60c serve to carry out the injection into the chamber 44 of a tracer gas in order to test and calibrate the sampling and detection device comprising the lines 55a to 55d.

The enclosure 40 may be constructed in a simple manner by assembling modular panels 35 some of which are constructed in a manner similar to the panels 35a, 35c and 35d and comprise sampling and/or injection devices integrated into their structures.

The lateral wall 41 of cylindrical shape may equally well be constituted by modular heat-insulating panels assembled to one another with interposition of seals. Some of these panels may equally well be constructed in the form of modular members according to the invention and may comprise integrated sampling and/or injection devices.

The invention therefore makes it possible to construct in a simple manner an enclosure for confinement, recovery and detection of leakage gases around or on part of an external wall of a receptacle or pipeline enclosing a fluid at high temperature.

The sampling and/or injection devices are fitted simultaneously with the panels constituting the walls of the enclosure.

The wall members may have a shape different from the modular members which have been described above. The sampling and injection means integrated into these modular members may also be different from those which have been described.

Lastly, the modular members according to the invention may be used for the construction of enclosures other than those for confinement of part of the upper surface of the head of the vessel of a pressurized water nuclear reactor. These wall members may be used in order to construct thermal insulation and confinement enclosures of any receptacle, pipeline or apparatus intended to enclose a fluid at high temperature and possibly at high pressure.

We claim:

1. In a confinement and heat-insulating enclosure of a receptacle enclosing a fluid at high temperature, said enclosure having a wall covering at least a part of an outer surface of said receptacle and providing, between an inner surface of said wall facing said outer surface of said receptacle and said outer surface of said receptacle, a sealed chamber for confinement and recovery of fluid leaking from said receptacle, a modular wall member of said enclosure in the form of a heat-insulating panel comprising a sampling means for sampling fluid from said chamber constituted by at least one duct extending in a direction parallel to said panel housed in an interior part of said panel adjacent to the inner surface of said enclosure and having at least one aperture opening onto the inner surface of said enclosure and connected to a sampling pipe passing through said panel and opening onto an outer surface of said enclosure.

2. Wall member according to claim 1, wherein said at least one duct is constituted at least partially by said heat-insulating panel.

3. Wall member according to claim 1, wherein said at least one duct is added to and fixed onto said heat-insulating panel.

4. Wall member according to any one of claims 1, 2, and 3, comprising means for leaktight connection of said at least one duct to a duct of a second modular wall member.

5. Wall member according to claim 4, wherein said receptacle is a vessel of a pressurized water nuclear reactor, said wall member being incorporated in an enclosure for confining and covering at least part of the convex outer surface of a head of said vessel through which pass a plurality of adaptors, wherein said heat-insulating panel comprises at least one duct and lateral walls for connection to other heat-insulating panels.

6. Wall member according to claim 5, wherein said panel additionally comprises on a lateral face of said panel at least one aperture for the passage of an adaptor.

7. Wall member according to any one of claims 1, 2 and 3, wherein said at least one duct is a duct of a network for sampling fluid from said chamber.

8. Wall member according to claim 1, further comprising a means for injecting fluid into said chamber having at least one aperture opening onto an inner surface of said heat-insulating panel and at least one means for connection to an injection line opening onto the outer surface of said heat-insulating panel.

\* \* \* \* \*